United States Patent [19]

Fluharty

[11] Patent Number: 4,733,900
[45] Date of Patent: Mar. 29, 1988

[54] ENGINE COVER CONSOLE

[75] Inventor: William J. Fluharty, Holland, Mich.

[73] Assignee: Prince Corporation, Holland, Mich.

[21] Appl. No.: 16,848

[22] Filed: Feb. 20, 1987

[51] Int. Cl.4 ................................................. B60R 7/04
[52] U.S. Cl. ..................................... 296/37.8; 108/134
[58] Field of Search ............................ 296/37.8, 37.12; 108/45, 134; 224/42.42 R

[56] References Cited

U.S. PATENT DOCUMENTS

| D. 224,673 | 8/1972 | Brooks | 108/44 |
| 1,109,734 | 9/1914 | Bauer | 224/42.01 |
| 1,755,543 | 6/1928 | Hill | 224/42.42 R |
| 2,789,861 | 4/1957 | Hudson | 296/37.12 |
| 2,904,378 | 9/1958 | MacIver | 108/25 |
| 3,345,118 | 12/1965 | Cummings | 312/235 |
| 3,600,725 | 9/1969 | McCartney | 5/94 |
| 3,722,946 | 3/1973 | Cary | 296/164 |
| 4,087,126 | 5/1978 | Wynn | 296/37.8 |
| 4,577,788 | 3/1986 | Richardson | 224/273 |

FOREIGN PATENT DOCUMENTS 2536854 3/1977 Fed. Rep. of Germany .
965649 8/1964 United Kingdom .

Primary Examiner—Robert R. Song
Attorney, Agent, or Firm—Price, Heneveld, Cooper, DeWitt & Litton

[57] ABSTRACT

A console housing is adapted to cooperate with and be secured to an existing engine cover and includes a bifold table which can be extended from the housing to a use position or retracted within a recess in the housing for storage. The table of the preferred embodiment includes a pair of panels pivotally joined to one another with one of the panels defining a cover and having one edge pivotally coupled to the lower portion of the housing and the remaining panel defining the table and having an end which is latchably and releasably supported by an upper portion of the housing.

21 Claims, 13 Drawing Figures

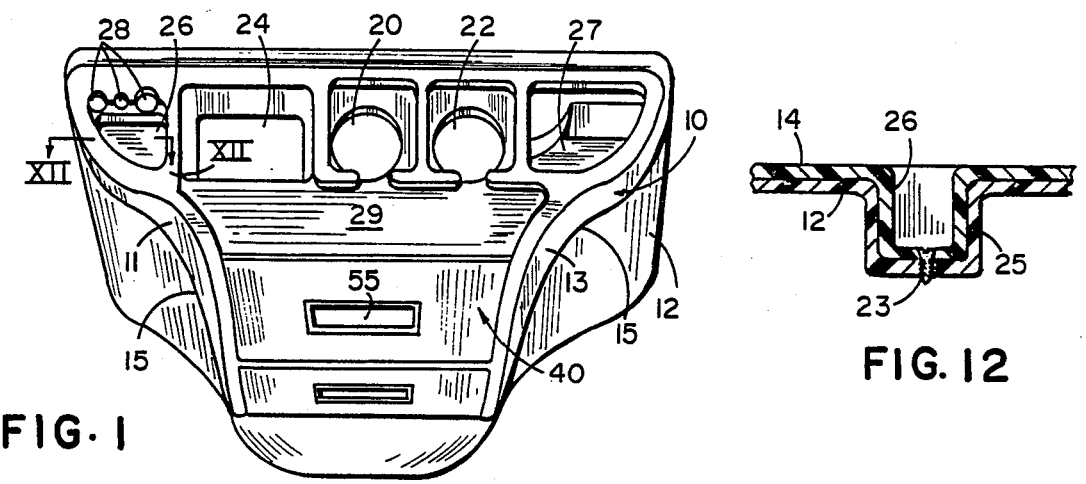
FIG. 1
FIG. 12
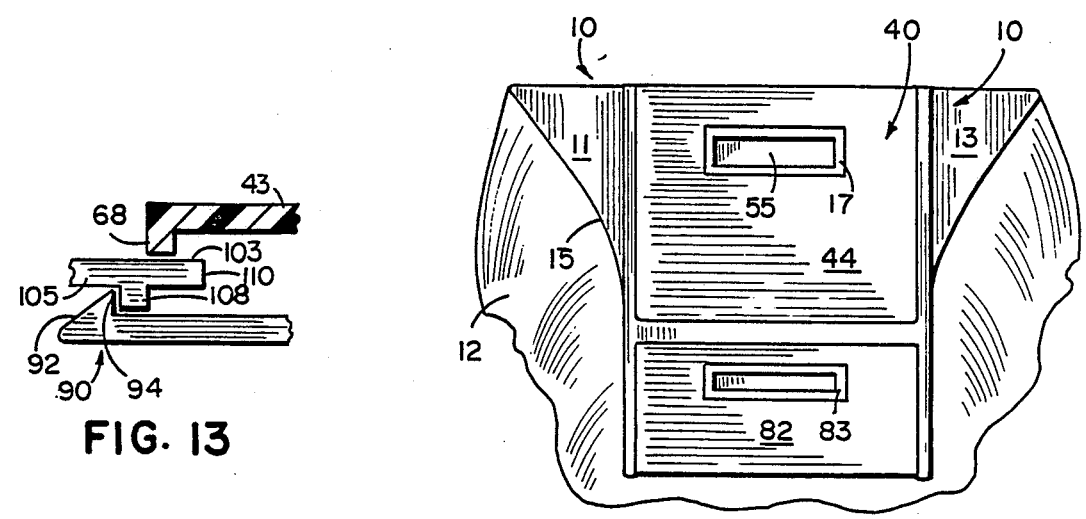
FIG. 13
FIG. 2
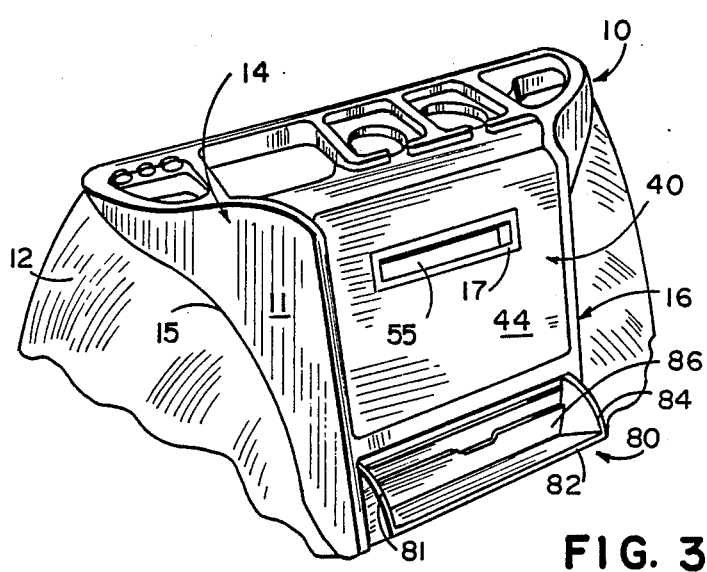
FIG. 3

U.S. Patent  Mar. 29, 1988  Sheet 3 of 3  4,733,900
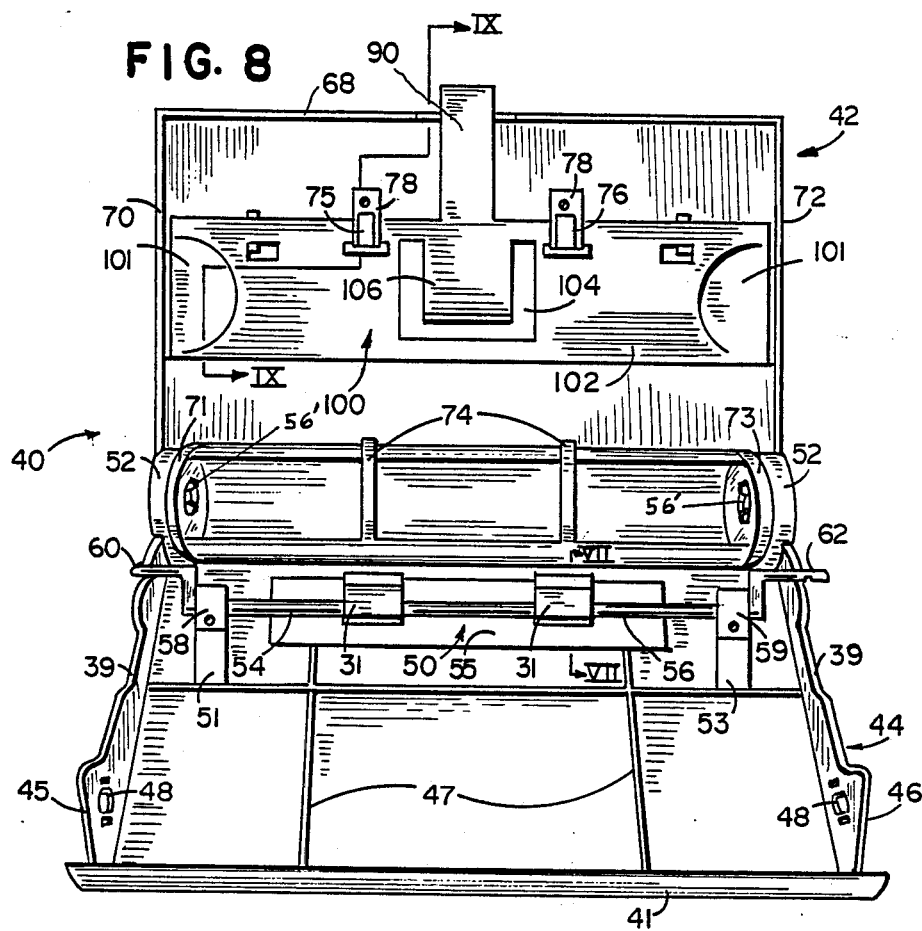
FIG. 8
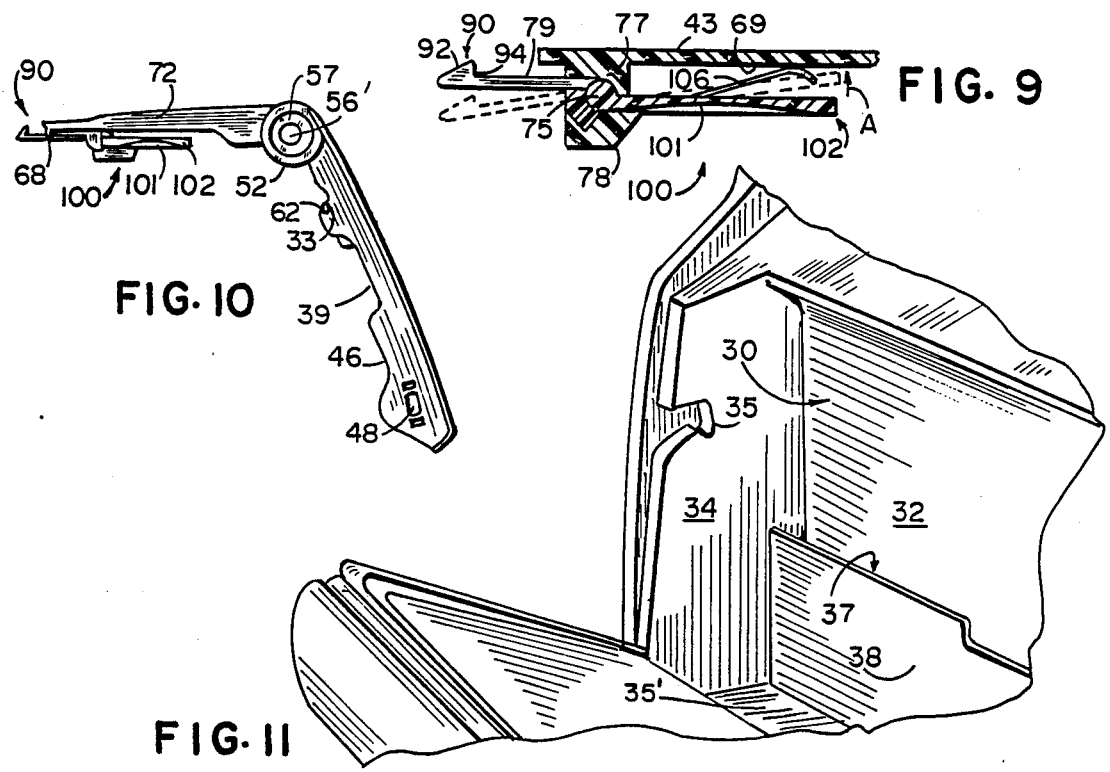
FIG. 9
FIG. 10
FIG. 11

ENGINE COVER CONSOLE

BACKGROUND OF THE INVENTION

The present invention relates to a console and particularly one for use in connection with an engine cover for a vehicle.

Many full sized vans currently made by U.S. automotive manufacturers includes an engine cover which is removable for selective servicing of the engine. Some of these covers include rudamental storage devices such as cup holders, ashtrays or a small storage tray or bin. Recreational vans of the type converted by van conversion companies have also included bolt-on trays which are affixed directly to the tops of the engine covers. These trays remain in a fixed position with respect to the engine cover.

SUMMARY OF THE PRESENT INVENTION

The console of the present invention comprises a housing which is adapted to cooperate with and be secured to an existing engine cover and one which includes a table which can be extended from the housing to a horizontal use position or retracted within a recess in the housing for storage when not in use. The table of the preferred embodiment includes a pair of panels pivotally joined to one another with one of the panels defining a cover and having one edge pivotally coupled to the lower portion of the housing and the remaining panel defining the table and having an end which is latchably and releasably supported by an upper portion of the housing. Thus, the panel sections defining the table and its support are of bifold construction for compact storage. Latching means are also provided between one of the panels and the housing for holding the table in a stored position within the recess. In one embodiment of the invention, the latching mechanism for holding the table in use and stored positions includes integral latch and spring means pivotally coupled to the panels and having dimensions significantly large to permit ease of use by the vehicle operator or a passenger.

In one embodiment of the present invention to table storage recess includes a map or magazine rack positioned behind the table storage and in another embodiment of the present invention a storage bin is provided below the table storage recess.

The console may conveniently further include one or more cup holders, an ashtray receptacle, a tray and other storage receptacles including for example, coin storage devices formed in its upper surface in addition to the storable table. These and other features, objects and advantages of the present invention will become apparent upon reading the following description thereof together with reference to the accompanying drawings in which:

BRIEF DESCRIPTION OF THE DRAWINGS

FIG. 1 is an elevated front perspective view of the console of the present invention and the engine cover to which it is attached;

FIG. 2 is a fragmentary front elevational view of the console and cover shown in FIG. 1;

FIG. 3 is a fragmentary left side perspective view of the console and cover showing the lower storage bin in an open position;

FIG. 8 is a perspective view of the underside of the table showing the latching mechanism for holding the table in a use position and in a stored position;

FIG. 9 is an enlarged fragmentary cross-sectional view of the latching mechanism for holding the table in a stored position;

FIG. 10 is a left side elevational view of the table assembly;

FIG. 11 is a fragmentary perspective view of a portion of the housing for receiving the latch mechanism associated with the table;

FIG. 12 is a fragmentary cross-sectional view of a portion of the console taken along section lines XII—XII of FIG. 1; and FIG. 13 is a fragmentary enlarged cross-sectional view of a portion of the table latch taken along section lines XIII—XIII of FIG. 5.

DETAILED DESCRIPTION OF THE PREFERRED EMBODIMENT

Figure 4:
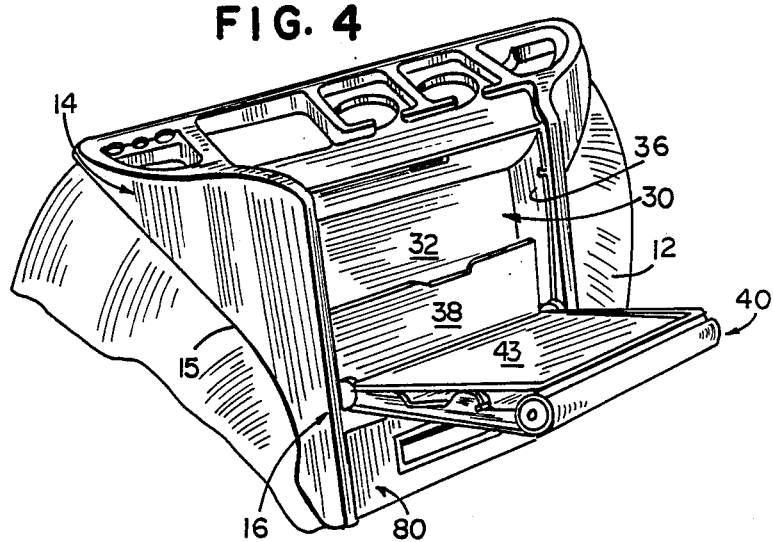
FIG. 4 is a left side perspective view of the console and cover showing the bifold table in an intermediate position.
Figure 5:
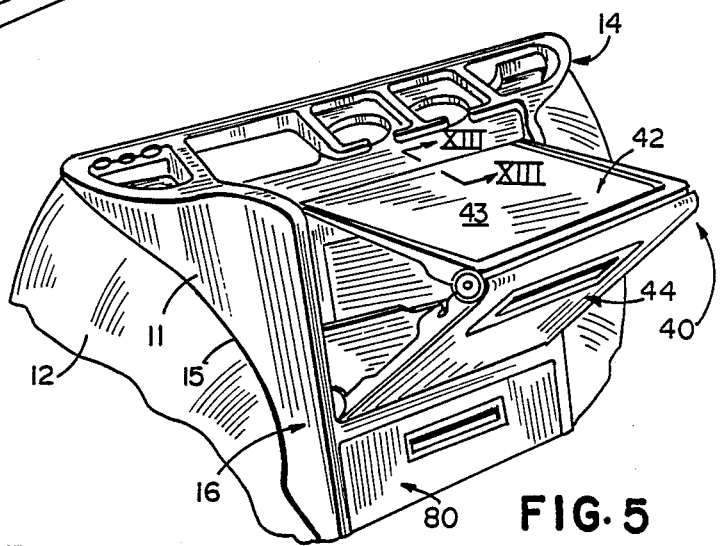
FIG. 5 is a fragmentary perspective view of the console and cover showing the table in a raised use position.

Referring initially to FIGS. 1–5 there is shown a console 10 embodying the present invention and which is adapted to be mounted to an engine cover 12 which in turn is secured to the vehicle by suitable attachment means. The engine cover 12 shown is for a Ford van and console 10 is shaped to nest partially within and overlying the curvilinear surface of engine cover 12. The console 10 is generally inverted L-shaped as seen in FIGS. 3–6 having an upper generally horizontally extending portion 14 and a lower generally vertically extending portion 16 as best seen in FIGS. 4 and 5.

Console 10 is integrally molded of a suitable polymeric material such as a styrene co-polymer. In the preferred embodiment Dylark 600 was employed. The console includes sidewalls 11 and 13 having curved edges 15 which conform to the curvature of engine cover 12 and seat closely adjacent to the engine cover. Sidewalls 11 and 13 provide structural rigidity to the console and its mounting to cover 12 while the upper portion 14 nests within existing storage compartments and partially for such purpose, includes a plurality of downwardly formed storage receptacles such as cup holders 20 and 22, ashtray receptacle 24, storage receptacle 26 which includes a change holder 28 and a supplemental storage receptacle 27. The existing engine cover 12 will include one or more receptacles as for example, the ashtray 24 and a storage receptacle 25 under receptacle 26. As best seen in FIG. 12 the upper wall portion 14 of console 10 overlies the engine cover 12 with receptacle 26 nesting within receptacle 25. Console 10 is further secured thereto at select locations by fastening means such as screws 23 as seen in FIG. 12. The upper portion 14 of console 10 also includes a horizontal tray 29 located rearwardly of cup holders 20 and 22 and ashtray 24.

Figure 6:
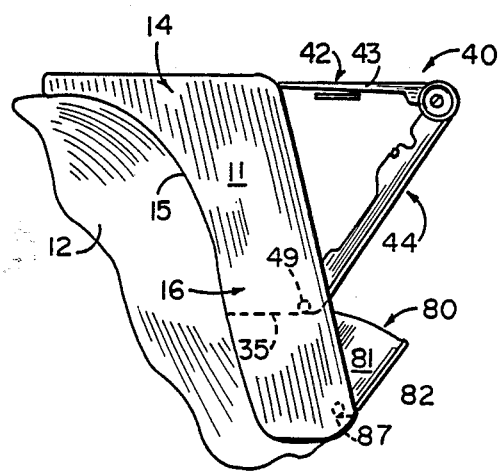
FIG. 6 is a fragmentary left side elevational view of the console showing the table in the use position.

The lower portion 16 of console 10 includes a recess 30 (FIG. 4) for storably receiving a bifold table assembly 40 therein when in a stored position as shown in FIGS. 1-3. Below the bifold table assembly 40, there is provided a pivoted storage bin 80 which pivots outwardly from the lower portion 16 of console 10 as best seen in FIGS. 3 and 6. Bin 80 includes a front cover 82 having a handle 83 formed therein for opening the generally triangular bin construction including sidewalls 81 and 84 and a rear wall 86. The bin is pivotally coupled to the sidewalls 11 and 13 of console 10 at the bottom thereof by suitable pivot pins 87 shown in phantom form in FIG. 6. Bin 80 can be used for a variety of functions including for example, sunglass storage and the like.

The recess 30 for receiving assembly 40 is defined by a rear wall 32 (FIG. 4) sidewalls 34 and 36 and a floor 35' (FIG. 11). Each of the sidewalls include an inverted L-shaped notch 35 formed therein for releasably receiving the ends 60 and 62 of latching bars associated with the table assembly 40 for holding the table in a stored position. The recess 30 also includes a storage pocket 37 defined by a generally vertically extending wall 38 extending upwardly from the floor 35' (FIG. 11) and spaced from rear wall 32 to define a map pocket or the like. Recess 30 is sufficiently deep to provide the pocket 37 and adequate space for the storage of table assembly 40 now described particularly in connection with FIGS. 4-10.

The table assembly 40 comprises a pair of pivotally coupled panels 42 and 44 with panel 44 defining the outer surface or cover of the table when stored as shown in FIGS. 1-3 and panel 42 defining the table surface 43 when the table is in its use position as illustrated in FIGS. 5 and 6. Panels 42 and 44 are joined along their common edges by a pair of pivot pins as best seen in FIG. 8. Referring to FIG. 8, assembly 40 is shown as viewed from the inside as seen in FIG. 5 with the cover 44 being in the lower portion of the Figure. Cover panel 44 includes a curved lower end 41 which extends into recess 30 at its lower end for providing a finished appearance for the lower edge of the cover. A pair of edge walls 45 and 46 provide rigidity to the panel as do a plurality of spaced reinforcing ribs 47. The lower edges of walls 45 and 46 include apertures 48 for receiving therein pivot pins 49 (shown in phantom and FIG. 6) for pivotally coupling the table assembly 40 to the sidewalls 11 and 13 of console 10. Walls 45 and 46 are step cut at 39 to provide clearance for handle 64 associated with the latching mechanism of table panel 42 as described below.

Figure 7:
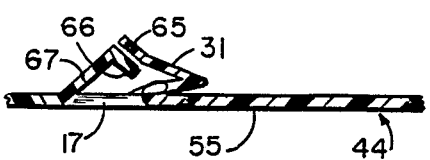
FIG. 7 is an enlarged fragmentary cross-sectional view of the mechanism for supporting and latching the table to the housing taken along section lines VII—VII of FIG. 8.

The table assembly 40 includes a first latching mechanism 50 associated with the cover panel 44 and which includes a pair of space mounting bosses 51 and 53 defining semi-circular sockets for receiving the pivot rod ends 54 and 56 integral with handle 55. Handle 55 extends through a rectangular aperture 17 (FIGS. 2 and 7) formed in the front of cover panel 44 with L-shaped pivot rods 54 and 56 extending through mounting bosses 51 and 53 and captively held thereto by fastening brackets 58 and 59 by suitable fastening screws. The ends 60 and 62 of the pivot rod sections 54 and 46 of latch mechanism 50 extend beyond the edges of sidewalls 45 and 46 and are urged in a downwardly position against the stop 33 in each of the sidewalls as best seen in FIG. 10. The rod ends 60, 62 nest within the inverted L-shape notches 35 of the sidewalls 34 and 36 of recess 30 for holding the table in a stored position as seen in FIGS. 1-3. The handle 55 and rod ends 60 and 62 are biased toward the downward position corresponding to the tables latched stored position by a pair of generally U-shaped springs 31 which can be integrally molded with handle 55 and which have the free end 65 which engages a tapered offset edge 66 of the housing 67 for handle 55 as best seen in FIG. 7. The handle 55 and integral spring 31 and rods 54 and 56 is molded of a suitable polymeric material such as polycarbonate.

The ends of sidewalls 45 and 56 of table panel 44 include bosses 52 which as seen in FIGS. 8 and 10 cooperate with correspondingly shaped bosses of table panel 42 and include apertures 57 for receiving pivot stub, pivot axles 56 therein as best seen in FIG. 8 for pivotally coupling table panel 42 to cover panel 44.

The table panel 42 includes sidewalls 70 and 72 and generally circular mounting bosses 71 and 73 which align with and are positioned inside bosses 52 for receiving stub axles 56. In addition, reinforcing ribs 74 are provided at spaced locations as best seen in FIG. 8. The latching mechanism 100 for holding the table to the console housing for use as best seen in FIGS. 8-10 and includes a relatively large handle 102 which extends substantially the width of the table panel 42 and includes a pair of concave recesses 101 on either side thereof to allow a user to easily grasp the handle 102 and squeeze it in a upwardly direction as indicated in FIG. 9 by arrow A for unlatching the front edge of the table from the upper portion 14 of the console 10 as described below.

Handle 102 of latch mechanism 100 is cutout in a U-shaped notch 104 as best seen in FIG. 8 which surrounds a center portion of the handle 102 between the upstanding legs of the U-shaped notch 104 to integrally define a leaf spring 106 which is deflected slightly upwardly as viewed in FIG. 9 and urges against the lower surface 69 of table 43 as best seen in FIG. 9 for urging the latch mechanism in a latching position shown in solid lines in FIG. 9.

The upper edge of handle 102 as seen in FIG. 8 integrally includes a pair of axle sections 75 and 76 which are received in a pair of spaced semi-cylindrical mounting bosses 77 intergrally formed on the inner side 69 of table 43 as best seen in FIG. 9. The axle sections 75 and 76 are captively held by attachment members 78 which includes a semi-circular recess and together with bosses 77 define a pair of spaced cylindrical sockets for the pivot axles 75 and 76. Integral with spring section 106 is a latching bar 79 having a trapezoidal latch 90 at the end thereof which includes a downwardly tapered incline surface 92 and a vertically extending locking edge 94. The rear edge of the upper portion 14 of console 10 is shown in FIG. 13 and includes a lip 103 over which the downwardly depending edge 68 (FIGS. 8 and 10) of table panel 42 rests. The console housing 105 includes a downwardly projecting latch bar 108 spaced inwardly from the front edge 110 of lip 103 to receive the latching end 90 of latch 100 as best seen in FIG. 13.

Thus, when the table is in its upright locked position as illustrated in FIG. 5, the front edge 68 of panel 42 overlies lip 103 of the upper portion 14 of the console housing 105 for providing support thereto while at the same time latch member 90 engages latching bar 108 as seen in FIG. 13 for latching the table preventing movement from the supported position shown in FIG. 5. The latch 90 is held in the latched position shown in FIGS. 9 and 13 by the integral spring 106 which, with handle 102 is integrally molded of a resilient polymeric material such as polycarbonate.

For operation of the table, the vehicle operator or passenger reaches within the handle recess 17 and pulls handle 55 downwardly rotating locking bars 60 and 62 upwardly out of locking notches 35 in storage recess 30. This permits the bifolded table assembly 40 to be pivoted downwardly to a position shown in FIG. 4. The user then reaches within the notches 39 and grasps the edges of table panel 42 raising the table section and pushing it forwardly such that its forward edge 68 overlies the rearwardly projecting lip 103 of tray 29 while the tapered edge 92 of latch section 90 engages latching bar 108 automatically camming the latch downwardly until the table is seated after which it snaps under the force of spring 106 into a locked position as seen in FIG. 13 with the trailing edge 94 overlying latch bar 108. The table is then in a raised locked position as illustrated in FIGS. 5 and 6 and is conveniently available for use in supporting flat objects providing a writing surface or the like.

To store the table the operator squeezes on handle 102 using the convenient concave depressions 101 thereby moving the latch downwardly as illustrated in phantom form in FIG. 9 releasing it from latching bar 108 and allowing the table to be pulled rearwardly and folded downwardly into the position shown in FIG. 4. Once in the bifold position illustrated in FIG. 4, the cover 44 can be pivoted upwardly and into recess 30 whereupon rod ends 60 and 62 again latch in the notches 35 which include an upwardly inclined camming surface for guiding the rods into the L-shaped notches. In this position the table is again stored and in a locked position. Access to the map storage pocket 37 is achieved using the table assembly 40 simply as a door by moving the structure from a position shown in FIG. 3 to a position as shown in FIG. 4.

The console 10 of the present invention can be installed in a car during its manufacture as an OEM part or added as an after market item to an existing engine cover. Naturally if desired, the engine cover itself may be made to include the unique recesses and table mechanism of the present invention as an integral part of the cover as opposed to a separate console for attachment to the cover. These and other modifications to the preferred embodiment of the invention will become apparent to those skilled in the art but will fall within the spirit and scope of the present invention as defined by the appended claims.

The embodiments of the the invention in which an exclusive property or privilege is claimed are defined as follows:

1. A console for a vehicle, said console comprising:
a housing having a generally horizontal upper portion and a gernerally vertical lower protion with said lower portion including a recess formed therein;
a retractable and extendable table and means for pivotally mounting said table to said housing for storage within said recess, said table comprising a pair of panels of said panels pivotally coupled to said first panel and defining a table surface when panels are pivoted to an open position wherein said first panel is pivotally coupled at a lower end portion to said housing; and
means for securing an edge of said second panel to an edge of said housing adjacent said recess for holding said second panel in a generally horizontal position for use of the table.

2. The console as defined in claim 1, wherein said housing includes a support lip extending along an upper edge of said recess and wherein said second panel includes a ledge formed along an edge remote from its pivot connection to said first panel for overlying said lip for supporting said edge thereon.

3. The apparatus as defined in claim 2, wherein said console further includes latching means coupled to said second panel and to said housing for releasably latching said second panel to said housing adjacent said recess for holding the table in a use position.

4. The apparatus as defined in claim 3 wherein said first and second panels are pivotally mounted to each other to fold to a position overlying and parallel with each other for storage.

5. The apparatus as defined in claim 4 wherein said first panel has an exterior surface defining a cover when said table is stored and wherein said first panel includes means for releasably latching said panel to said housing for storage of said table.

6. The apparatus as defined in claim 1 wherein said console further includes a storage bin position below said recess.

7. The apparatus as defined in claim 1 wherein said console further includes means for holding cups formed in its horizontal portion.

8. The apparatus as defined in claim 1 wherein said console further includes means defining a storage bin formed in its upper portion.

9. The apparatus as defined in claim 1 wherein said console further includes means defining a tray formed in its upper portion.

10. The apparatus as defined in claim 1, wherein said housing includes curved walls which conform to the curvature of the vehicle structure to which said housing is attached.

11. The apparatus as defined in claim 1 wherein said housing is shaped to cooperate with an engine cover for a van-type vehicle.

12. A console for mounting to a vehicle engine cover, said console comprising:
a housing having a generally horizontally extending upper portion and a generally vertically extending lower portion with said lower portion including a recess formed therein said housing further including sidewalls having an edge configurated to correspond to the shape of an engine cover for a vehicle for attachment to the engine cover;
a retractable and extendable bifold table pivotally mounted to said housing for storage within said recess, said table comprising a pair of panels with one of said panels defining a cover and pivotally coupled at a lower portion thereof to said housing, and other of said panels pivotally coupled to said one panel and defining a table surface when said panels are pivoted to an open position; and
means for securing an edge of said other panel to an edge of said housing adjacent said recess for holding said table defining panel in the generally horizontal position for use of the table.

13. The console as defined in claim 12 wherein said housing includes a support lip extending along an upper edge of said recess and wherein said other panel includes a formed along an edge remote from its pivot connection to said first panel for overlying said lip.

14. The apparatus as defined in claim 13 wherein said console further includes latching means coupled to said other panel and to said housing for releasably latching said second panel to said housing adjacent said recess for holding the table in a use position.

15. The apparatus as defined in claim 16 wherein said one and other panels are pivotally mounted to each other to hold to a position overlying and parallel with each other for storage.

16. The apparatus as defined in claim 15 wherein said one panel has an exterior surface defining a cover when said table is stored and wherein said one panel includes means for releasably latching said one panel to said housing for storage of said table.

17. The apparatus as defined in claim 16 wherein said console further includes a storage bin position below said recess.

18. The apparatus as defined in claim 17 wherein said console further includes means for holding cups formed in its horizontal portion.

19. The apparatus as defined in claim 18 wherein said console further includes means defining a tray formed in its upper portion.

20. A housing and engine cover defining a console for mounting within a van-type vehicle to provide a cover for the vehicle engine and storage room, said console comprising:

an engine cover for positioning over an engine which extends within the vehicle interior;

a housing having a generally horizontal upper portion and a generally vertical lower portion with said lower portion including a recess formed therein;

a retractable and extendable table pivotally mounted to said housing for storage within said recess, said table comprising a pair of panels with one of said panels defining a cover and pivotally coupled at a lower portion thereof to said housing, and other of said panels pivotally coupled to said one panel and defining a table surface when said panels are pivoted to an open position; and means for securing an edge of said second panel to an edge of said housing adjacent said recess for holding said table defining panel in the generally horizontal position for use of the table.

21. The console as defined in claim 20 wherein said housing is removably mounted to said engine cover.

* * * * *

UNITED STATES PATENT AND TRADEMARK OFFICE
CERTIFICATE OF CORRECTION

PATENT NO. : 4,733,900

DATED : March 29, 1988

INVENTOR(S) : William J. Fluharty

It is certified that error appears in the above-identified patent and that said Letters Patent is hereby corrected as shown below:

Column 1, line 44:
    "to" should be --the--
Column 3, line 60:
    "46" should be --56--
Column 4, line 8:
    "56" should be --46--
Column 5, line 53, claim 1:
    "protion" should be --portion--
Column 5, line 58, claim 1
    insert "with a first of said panels defining a cover, and the second" before "of said panels"
Column 6, line 20, claim 6
    "position" should be --positioned--

Signed and Sealed this

Twenty-seventh Day of September, 1988

Attest:

DONALD J. QUIGG

Attesting Officer      Commissioner of Patents and Trademarks